United States Patent [19]
Paul

[11] 3,744,521
[45] July 10, 1973

[54] DIRECTIONAL CONTROL VALVE
[75] Inventor: John C. Paul, Richmond Heights, Ohio
[73] Assignee: Parker-Hannifin Corporation, Cleveland, Ohio
[22] Filed: Dec. 13, 1971
[21] Appl. No.: 207,267

[52] U.S. Cl. .......................................... 137/625.68
[51] Int. Cl. ............................................ F16k 11/00
[58] Field of Search .................. 137/625.68, 625.69, 137/625.48, 596.12, 596.2

[56] References Cited
UNITED STATES PATENTS

| | | | |
|---|---|---|---|
| 2,964,023 | 12/1960 | Mevlendyk | 137/625.68 X |
| 3,106,135 | 10/1963 | McAfee Jr. et al. | 137/625.69 X |
| 3,477,347 | 11/1969 | Rice | 137/625.68 X |
| 3,160,174 | 12/1964 | Schmiel et al. | 137/596.12 X |
| 3,212,522 | 10/1965 | Williams | 137/625.69 X |
| 3,299,903 | 1/1967 | Stacey | 137/596.2 X |
| 3,602,259 | 8/1971 | Martin | 137/625.68 |

Primary Examiner—Henry T. Klinksiek
Assistant Examiner—Robert J. Miller
Attorney—Walter Maky

[57] ABSTRACT

A four-way spool type valve assembly for controlling for example the boom actuating motor of a front end loader and the like characterized in that, when the spool is in power lower position, the return fluid from the motor is conducted to the return passage via a passage in one end portion of the spool and a restricted orifice which opens into the return passage. The valve assembly herein is further characterized in that, when the spool is in float position beyond the power lower position, the passage in said one end portion thereof yet communicates with the adjacent motor passage while additional passages axially adjacent the restricted orifice open into the return passage and in addition a passage in the other end portion of the spool intercommunicates both motor passages so that the boom may partake of rapid upward and downward float.

A further characterizing feature of the valve assembly herein is that there is a make-up check valve to prevent motor cavitation as during rapid floating movements of the boom.

8 Claims, 3 Drawing Figures

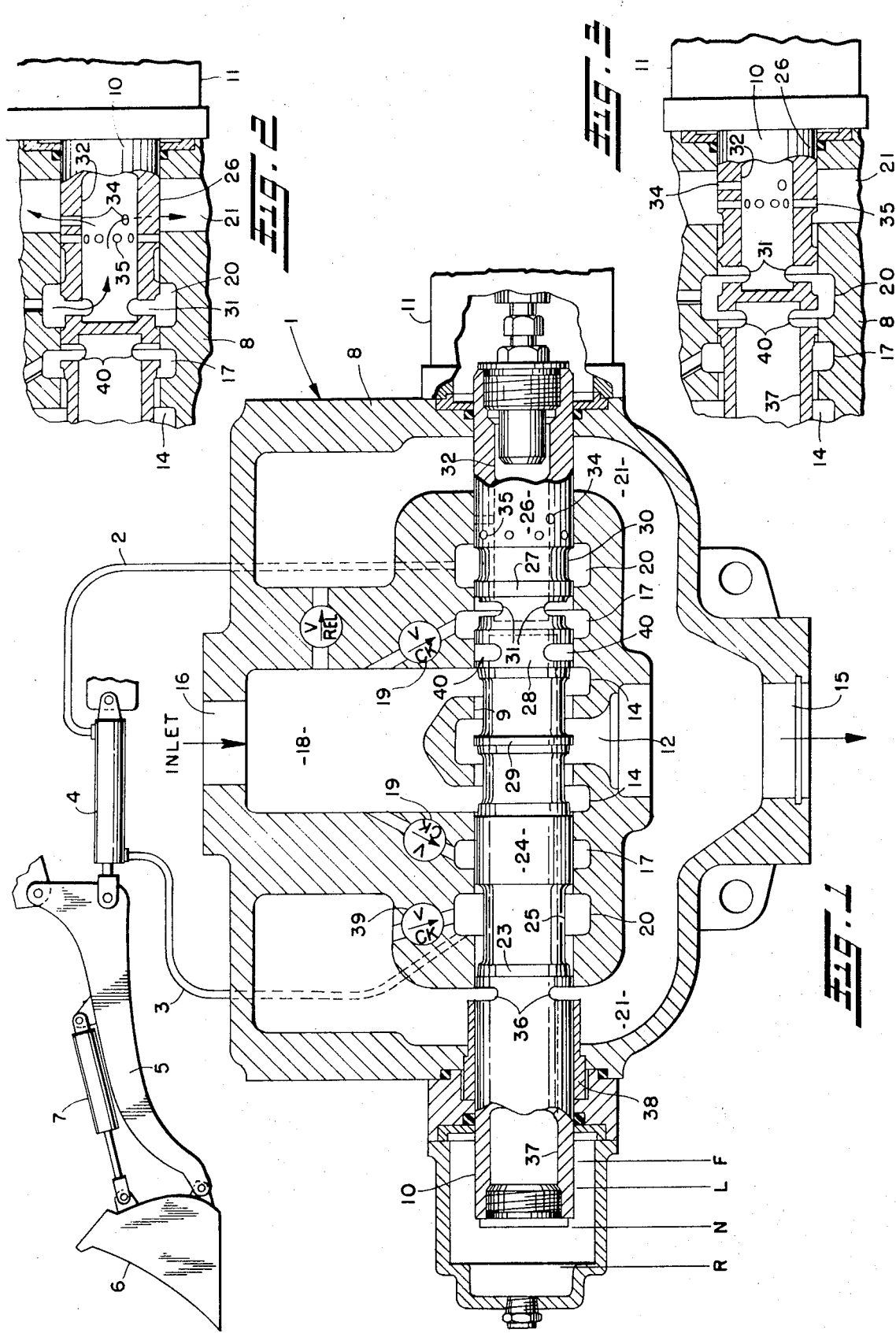

DIRECTIONAL CONTROL VALVE

BACKGROUND OF THE INVENTION

In a known four-way float spool valve the spool has a passage therein which communicates the motor passages with each other in the float position of the spool, said spool having an intermediate orifice which communicates the spool passage with the bypass passage of the valve housing. For illustration of this type of four-way float valve reference may be had to Schmiel U.S. Pat. No. 3,000,397 and Stacey U.S. Pat. Nos. 3,132,668 and 3,299,903, the latter two of which in addition utilize a sleeve in the housing bore which extends axially into the return passage.

Another known type of four-way float valve (Schmiel et al. U.S. Pat. No. 3,160,174 and Stacey U.S. Pat. No. 3,262,467) is similar to that disclosed in the aforesaid Stacey patents except that the spool land at the return passage is provided with restrictor slots so as to build up back pressure via such restrictor slots.

Yet another known type of four-way float valve (Stacey U.S. Pat. No. 3,106,065 and Markovich U.S. Pat. No. 3,120,858) has a check valve in the spool passage which builds up back pressure in the motor passages with the excess fluid from the head end of the motor being returned to the return passage downstream of the check valve.

As apparent from the foregoing, the four-way float valves employing a check valve in the spool passage are not suitable for applications where two-way float is desired and, in the cases where orifices are employed to build up back pressure and to permit excess fluid to flow to the bypass passage or to the return passage, the float action is necessarily slow and essentially one way since float action in the opposite direction will cause cavitation in the head end of the motor owing to necessity of drawing fluid through the orifice from the bypass or return passage.

Moreover, in connection with valves used to control the actuation of the boom of a front end loader or the like the known valves do not make any provision for restricted return flow from the motor to control the power lowering speed of the boom.

SUMMARY OF THE INVENTION

In contradistinction to the foregoing, the present invention has as its principal aim the provision of a spool type four-way float valve which in the power lowering position provides for restricted return flow of fluid from a double acting fluid motor to control the speed of lowering of a front end loader boom or the like and which in the float position provides for rapid two-way float through additional passages adjacent to the power lowering restricting passages of the spool.

It is another object of this invention to provide a four-way float valve of the character indicated which has a make-up check valve associated therewith to facilitate rapid float of the boom.

Other objects and advantages of the present invention will appear hereinafter.

BRIEF DESCRIPTION OF THE DRAWING

FIG. 1 is a central cross-section view of a preferred form of four-way float valve embodying the present invention;

FIG. 2 is a fragmentary cross-section view illustrating the spool in its power lower position whereat return flow of fluid from the motor is restricted; and FIG. 3 is a cross-section view similar to FIG. 2 except illustrating the spool in its float position whereat the boom operatively connected to the fluid motor may freely float upwardly and downwardly.

DETAILED DESCRIPTION OF THE INVENTION

As shown in FIG. 1 herein the directional control valve assembly 1 is operatively connected by conduits 2 and 3 to a double acting fluid motor 4 for raising and lowering the boom 5 of a front end loader and the like; said boom 5 having pivotally connected to the tip thereof a bucket or scoop 6 which is actuated by a double acting fluid motor 7. The motor 7 may be controlled as by a four-way spool valve (not shown).

The directional control valve assembly 1 herein shown comprises a housing 8 having a bore therethrough in which the spool 10 is reciprocated either manually or by a power assist mechanism 11, said spool bore 9 being intersected at axially spaced intervals therealong starting at the middle by downstream and upstream bypass passage portions 12 and 14 which respectively communicate with the return and inlet ports 15 and 16 of the housing 8, by a pair of pressure feed passages 17 which are communicated with the inlet chamber 18 via load check valves 19, by a pair of motor passages 20 which are connected by means of the conduits 2 and 3 to the opposite ends of the fluid motor 4, and by a pair of return passages 21 which communicate with the aforesaid return port 15.

When the spool 10 is in neutral N position as shown in FIG. 1 the inlet port 16 is open to the return port 15 via the bypass passage portions 14 and 12 whereby pump output is circulated at low pressure to and from a tank, neither the pump nor the tank being illustrated herein. In such neutral N position communication of the left motor passage 20 with adjacent return and pressure feed passages 21 and 17 is blocked by the spool lands 23 and 24 which straddle the groove 25 therebetween and communication of the right motor passage 20 with the adjacent return and pressure feed passages 21 and 17 is blocked by the spool lands 26 and 27.

When the spool 10 is shifted to the left to the raise R position the bypass passage 14–12 is closed by the spool lands 28 and 29 and fluid under pressure in the inlet chamber 18 passes through the right load check valve 19 into the right pressure feed passage 17 and flows to the right motor passage 20 and into the head end of the fluid motor 4 via the spool groove 30 and via the spool passages 31, 32, and sets of passages 34 and 35. The fluid displaced from the rod end of the motor 4 is conducted to the return port 15 via the spool groove 25 which intercommunicates the left motor passage 20 with the left return passage 21, the slots 36 opening into passage 37 in the spool at that time being within the sleeve 38 which extends part way into the left return passage 21.

Now, when the spool 10 is shifted to the right from the neutral N position to the lower L position, as shown in FIG. 2, the bypass passage 14–12 is closed by the spool lands 29 and 24 and fluid under pressure in the inlet chamber 18 flows through the left load check valve 19 into the left pressure feed passage 17 and thence flows over the spool groove 25 into the left motor passage 20 into the rod end of the motor 4. The return fluid displaced from the head end of the motor 4 flows into the right motor passage 20 and through the passages 31, 32, and 34 into the right passage 21. The passages 34 constitute restrictor orifices to control the rate of power lowering of the boom 5. If, under certain conditions of operation, the rod end of the motor 4 tends to cavitate, the make-up check valve 39 associated with the left motor passage 20 will open for flow of fluid from the return passage 21 into said motor passage 20.

When the spool is shifted further to the right to the float F position, as shown in FIG. 3, both sets of the spool passages 34 and 35 are disposed in the right return passage 21 are in fluid communication with the right motor passage 20 via the passages 32 and 31. Also, in this position, the slots 40 in the land 28 communicate the left motor passage 20 with the right motor passage 20 via the passages 37 and 36 thus to provide for rapid upward and downward float of the boom 5. When the boom 5 floats upwardly the return flow from the rod end of motor 4 flows into the left motor passage 20 and thence through the slots 36, the passage 37, and the slots 40 into the right motor passage 20 wherefrom the fluid is returned to the head end of motor 4. The fluid deficiency flows from the right return passage 21 through both sets of passages 34 and 35, passage 32 and slots 31 into the right motor passage 20.

When the boom 5 floats downwardly fluid is displaced from the head end of the motor 4 into the right motor passage 20 and divides with excess fluid flowing through the axially spaced apart sets of passages 34 and 35 into the right return passage 31 and the fluid required to maintain the rod end of the motor 4 full flows through the aforesaid slots 40, passage 37, and slots 36 into the left motor passage 20. If a negative pressure condition develops in the left motor passage 20, the make-up check valve 39 will open to supply additional fluid from the left return passage 21 to the left motor passage 20.

I, therefore, particularly point out and distinctly claim as my invention.

1. A valve assembly comprising a housing having a bore intersected axially therealong by an inlet passage, a return passage, and a pair of motor passages respectively adapted for connection with a fluid pressure source, a tank, and a fluid motor; a valve spool reciprocable in said bore from a neutral position whereat communication of said motor passages with said inlet and return passages is blocked to operating positions whereat said inlet and return passages are selectively communicated with said motor passages to control actuation of such fluid motor; said spool having a first passage therein which in one operating position provides restricted communication between one motor passage and said return passage to control the rate of actuation of such fluid motor by fluid under pressure conducted from said inlet passage to the other motor passage.

2. The valve assembly of claim 1 wherein said spool has additional passages communicating with said first passage through which fluid under pressure is conducted from said inlet passage to said one motor passage in another operating position of said spool and wherein said spool has a peripheral groove freely communicating said other motor passage with said return passage in said another operating position.

3. The valve assembly of claim 1 wherein said spool has a float position whereat a second passage in said spool communicates said motor passages with each other and whereat passages in said spool in addition to that which provides for such restricted flow of fluid from said one motor passage to said return passage provide free flow of fluid between said one motor passage and said return passage in said float position.

4. A valve assembly comprising a housing having a bore intersected axially therealong by an inlet passage, a return passage, and a pair of motor passages respectively adapted for connection with a fluid pressure source, a tank, and a fluid motor; a valve spool reciprocable in said bore from a neutral position whereat communication of said motor passages with said inlet and return passages is blocked to operating positions whereat said inlet and return passages are selectively communicated with said motor passages to control actuation of such fluid motor; said spool having a first passage therein which in one operating position provides restricted communication between one motor passage and said return passage to control the rate of actuation of such fluid motor by fluid under pressure conducted from said inlet passage to the other motor passage; said spool having a float position whereat a second passage in said spool communicates said motor passages with each other and whereat passages in said spool in addition to that which provides for such restricted flow of fluid from said one motor passage to said return passage provide free flow of fluid between said one motor passage and said return passage in said float position; and a make-up check valve in said housing operative to supply fluid from said return passage to a motor passage in the event of development of a negative pressure condition in said first and second passages and said motor passages when said spool is in said float position.

5. A valve assembly comprising a housing having a bore intersected axially therealong by an inlet passage, a return passage and a pair of motor passages respectively adapted for connection with a fluid pressure source, a tank, and a fluid motor; a valve spool reciprocable in said bore from a neutral position whereat communication of said motor passages with said inlet and return passages is blocked to operating positions whereat said inlet and return passages are selectively communicated with said motor passages to control actuation of such fluid motor; said spool having a first passage in one end portion thereof which opens into one motor passage and into said return passage with restricted communication from said passage into said return passage in one operating position of said spool to control the rate of actuation of such fluid motor by fluid under pressure conducted from said inlet passage to the other motor passage; said spool having a float position whereat a second passage in the other end portion thereof opens into said other motor passage and opens to said one motor passage adjacent the opening of said first passage thereto, said spool having additional openings from said first passage into said return passage when said spool is in said float position to provide for free flow of fluid between said motor passages and said return passage for rapid float of the movable component of such fluid motor in opposite directions.

6. The valve assembly of claim 5 wherein the fluid communication between said one motor passage and said return passage in said float position is through said restricted opening and through such additional openings.

7. A valve assembly comprising a housing having a bore intersected axially therealong by an inlet passage, a retrun passage and a pair of motor passages respectively adapted for connection with a fluid pressure source, a tank, and a fluid motor; a valve spool reciprocable in said bore from a neutral position whereat communication of said motor passages with said inlet and return passages is blocked to operating positions whereat said inlet and return passages are selectively communicated with said motor passages to control actuation of such fluid motor; said spool having a first passage in one end portion thereof which opens into one motor passage and into said return passage with restricted communication from said passage into said return passage in one operating position of said spool to control the rate of actuation of such fluid motor by fluid under pressure conducted from said inlet passage to the other motor passage; said spool having a float position whereat a second passage in the other end portion thereof opens into said other motor passage and opens to said one motor passage adjacent the opening of said first passage thereto, said spool having additional openings from said first passage into said return passage when said spool is in said float position to provide for free flow of fluid between said motor passages and said return passage for rapid float of the movable component of such fluid motor in opposite directions; and a make-up check valve in said housing operative to supply fluid from said return passage to a motor passage in the event of development of negative pressure conditions in said motor passages.

8. A valve assembly comprising a housing having a bore intersected axially therealong by an inlet passage, a return passage and a pair of motor passages respectively adapted for connection with a fluid pressure source, a tank, and a fluid motor; a valve spool reciprocable in said bore from a neutral position whereat communication of said motor passages with said inlet and return passages is blocked to operating positions whereat said inlet and return passages are selectively communicated with said motor passages to control actuation of such fluid motor; said spool having a first passage in one end portion thereof which opens into one motor passage and into said return passage with restricted communication from said passage into said return passage in one operating position of said spool to control the rate of actuation of such fluid motor by fluid under pressure conducted from said inlet passage to the other motor passage; siad first passage having additional openings adjacent to said restricted opening to freely communicate said one motor passage with said inlet passage in another operating position of said spool.

* * * * *